US010695820B2

(12) United States Patent
Luebke

(10) Patent No.: US 10,695,820 B2
(45) Date of Patent: Jun. 30, 2020

(54) METHOD FOR FORMING AN ENDODONTIC INSTRUMENT OR DEVICE

(71) Applicant: GOLD STANDARD INSTRUMENTS, LLC, Brookfield, WI (US)

(72) Inventor: Neill Hamilton Luebke, Brookfield, WI (US)

(73) Assignee: GOLD STANDARD INSTRUMENTS, LLC, Brookfield, WI (US)

(*) Notice: Subject to any disclaimer, the term of this patent is extended or adjusted under 35 U.S.C. 154(b) by 406 days.

(21) Appl. No.: 15/509,933

(22) PCT Filed: Sep. 9, 2015

(86) PCT No.: PCT/US2015/049087
§ 371 (c)(1),
(2) Date: Sep. 26, 2017

(87) PCT Pub. No.: WO2016/040416
PCT Pub. Date: Mar. 17, 2016

(65) Prior Publication Data
US 2018/0036789 A1    Feb. 8, 2018

Related U.S. Application Data

(60) Provisional application No. 62/047,874, filed on Sep. 9, 2014.

(51) Int. Cl.
*B21F 45/00* (2006.01)
*A61C 5/40* (2017.01)
*A61C 5/42* (2017.01)

(52) U.S. Cl.
CPC .............. *B21F 45/008* (2013.01); *A61C 5/40* (2017.02); *A61C 5/42* (2017.02); *Y10T 29/49567* (2015.01)

(58) Field of Classification Search
CPC .... B21F 45/008; Y10T 29/49567; A61C 5/40; A61C 5/42
See application file for complete search history.

(56) References Cited

U.S. PATENT DOCUMENTS

| 6,149,501 A | 11/2000 | Farzin-Nia et al. |
| 6,422,010 B1 * | 7/2002 | Julien .................. F01D 25/005 60/527 |

(Continued)

OTHER PUBLICATIONS

The International Search Report and Written Opinion as dated Jan. 20, 2016 for International Application No. PCT/US2015/049087.

*Primary Examiner* — Jason L Vaughan
(74) *Attorney, Agent, or Firm* — Quarles & Brady LLP

(57) ABSTRACT

Methods for manufacturing an endodontic instrument or device, such as an endodontic file for use in performing root canal therapy on a tooth, are disclosed. The method may include the steps of: (a) providing a wire or wire blank comprising a nickel titanium alloy that has been heat-treated at a heat-treat temperature and has an angle greater than 5 degrees of permanent deformation after torque at 45 degrees of flexion tested in accordance with ISO Standard 3630 Part 1: General requirements and test methods and (b) removing material from the wire or wire blank to form an endodontic instrument or device. The method may include the steps of: (a) providing a wire or wire blank comprising a nickel titanium alloy at a first temperature; and (b) removing material from the wire or wire blank at a second temperature above the first temperature to form an endodontic instrument or device.

13 Claims, 2 Drawing Sheets

(56) References Cited

U.S. PATENT DOCUMENTS

| | | | |
|---|---|---|---|
| 9,199,310 B2* | 12/2015 | Al-Sudani | B22F 5/12 |
| 10,351,934 B2* | 7/2019 | Ammon | C21D 6/007 |
| 2002/0137008 A1* | 9/2002 | McSpadden | A61O 5/42 |
| | | | 433/102 |
| 2003/0120181 A1* | 6/2003 | Toma | A61L 31/022 |
| | | | 600/585 |
| 2005/0069837 A1* | 3/2005 | Lewis | B23H 9/08 |
| | | | 433/102 |
| 2006/0014480 A1 | 1/2006 | Aloise et al. | |
| 2006/0185170 A1 | 8/2006 | Lewis et al. | |
| 2006/0281047 A1* | 12/2006 | Badoz | B24B 19/04 |
| | | | 433/102 |
| 2007/0116532 A1* | 5/2007 | Lewis | B21C 37/045 |
| | | | 409/131 |
| 2008/0032260 A1* | 2/2008 | Luebke | B21F 45/008 |
| | | | 433/102 |
| 2011/0271529 A1 | 11/2011 | Gao et al. | |
| 2012/0272526 A1 | 11/2012 | Luebke | |
| 2013/0240092 A1* | 9/2013 | Gao | A61C 7/20 |
| | | | 148/402 |
| 2013/0263700 A1* | 10/2013 | Johnson | B24B 1/00 |
| | | | 76/12 |
| 2019/0284664 A1* | 9/2019 | Ammon | C22C 38/40 |

* cited by examiner

METHOD FOR FORMING AN ENDODONTIC INSTRUMENT OR DEVICE

CROSS-REFERENCE TO RELATED APPLICATIONS

This application represents the U.S. National State of International Application No. PCT/US2015/049087, filed Sep. 9, 2015 which claims priority from U.S. Patent Application No. 62/047,874 filed Sep. 9, 2014. The contents of this application are hereby incorporated by reference as if set forth in their entirety herein.

STATEMENT REGARDING FEDERALLY SPONSORED RESEARCH

Not Applicable.

BACKGROUND OF THE INVENTION

1. Field of the Invention

The invention relates to instruments used in medicine and dentistry. More particularly, the invention relates to methods for forming endodontic instruments or devices, such as drills, burs and files used by dentists.

2. Description of the Related Art

Endodontics or root canal therapy is the branch of dentistry that deals with diseases of the dental pulp and associated tissues. One aspect of endodontics comprises the treatment of infected root canals by removal of diseased pulp tissues and subsequent filling.

FIG. 1 shows a representation of a tooth to provide background. Root canal therapy is generally indicated for teeth having sound external structures but having diseased, dead or dying pulp tissues. Such teeth will generally possess intact enamel 10 and dentin 12, and will be satisfactorily engaged with the bony tissue 20, by among other things, healthy periodontal ligaments 18. In such teeth, the pulp tissue 14, and excised portions of the root 16, should be replaced by a biocompatible substitute. FIG. 1 also shows the apical foramen 22 through which blood and nerves pass to support the pulp tissues.

One method for the preparation of a root canal for filling is represented by FIGS. 2a-2e. A tooth having a basically sound outer structure 24 but diseased pulp 26, is cut with conventional or coated dental drill 28 creating a coronal access opening 30. A broach is used for gross removal of pulp material 26 from the root canal through the coronal access opening 30. The void 32 formed is enlarged as in FIG. 2d with file 34, to result in a fully excavated cavity 36. Debris is removed from this cavity by flushing and the cavity cleansed to remove all diseased tissue. The excavated canal is then ready for filling.

During this procedure, small endodontic instruments (e.g., file 34) are utilized to clean and enlarge the long narrow tapered root canals. While most files perform entirely satisfactorily when cleaning and enlarging a straight root canal, problems have been encountered when using certain files to clean and enlarge a curved root canal. As will be understood by those skilled in the art, a very large portion of the root canals encountered by a practicing dentist and/or endodontist are of the curved variety, and thus this problem is a significant one for the profession.

When performing an operation on a curved root canal with a smaller diameter file, the file can easily be inserted into the curved canal and will easily bend to fit the curved shape of the canal due to the flexibility of the small diameter file. In FIG. 1a, there is shown the file 34 of FIG. 2d in a bent position. The file 34 has a shank 42 mounted at its proximate end 47 to a handle 43. The shank 42 may include calibrated depth markings 45 and further includes a distal end 48. The shank 42 includes two continuous helical flutes 51 as shown in FIG. 1b that extend along its lower portion. The flutes 51 define a cutting edge. A helical land 53 is positioned between axially adjacent flutes as shown in FIG. 1b.

While file 34 can easily bend to fit the curved shape of a canal due to the flexibility of the small diameter shank 42, with increasingly larger sizes of files, the file becomes significantly less flexible and becomes more and more difficult to insert through the curved portion of the canal. In some cases, the relatively inflexible file will cut only on the inside of the curve and will not cut on the outside of the curvature of the root canal. Thus, the problems, which occur during the therapy of a root canal, are often the result of the basic stiffness of the files, particularly with the respect to the instruments of larger diameter.

The endodontic files produced by the methods of U.S. Pat. Nos. 8,062,033, 8,083,873, 8,562,341, 8,727,773, and 8,876,991 solve the aforementioned problems encountered when cleaning and enlarging a curved root canal. However, it would be beneficial to provide alternative methods for forming endodontic files.

SUMMARY OF THE INVENTION

The present invention provides methods for forming an endodontic instrument or device. One non-limiting example product of the method of the invention is an endodontic file that overcomes problems encountered when cleaning and enlarging a curved root canal.

A first aspect of the invention is a method for forming an endodontic instrument or device. The method includes the steps of: (a) providing a wire or wire blank comprising a nickel titanium alloy that has been heat-treated at a heat-treat temperature and has an angle greater than 5 degrees of permanent deformation after torque at 45 degrees of flexion tested in accordance with ISO Standard 3630 Part 1: General requirements and test methods and (b) removing material from the wire or wire blank to form an endodontic instrument or device.

A second aspect of the invention is an endodontic instrument or device prepared by a process including the steps of: (a) providing a wire or wire blank comprising a nickel titanium alloy that has been heat-treated at a heat-treat temperature and has an angle greater than 5 degrees of permanent deformation after torque at 45 degrees of flexion tested in accordance with ISO Standard 3630 Part 1: General requirements and test methods; and (b) removing material from the wire or wire blank to form an endodontic instrument or device.

In the method for forming an endodontic instrument or device, or the endodontic instrument or device prepared using the process steps, the heat-treated wire or wire blank in step (a) can have an angle greater than 10 degrees of permanent deformation after torque at 45 degrees of flexion tested in accordance with ISO Standard 3630 Part 1: General requirements and test methods. The heat-treated wire or wire blank in step (a) can have an angle greater than 15 degrees of permanent deformation after torque at 45 degrees of flexion tested in accordance with ISO Standard 3630 Part 1:

General requirements and test methods. The heat-treated wire or wire blank in step (a) can have an angle greater than 20 degrees of permanent deformation after torque at 45 degrees of flexion tested in accordance with ISO Standard 3630 Part 1: General requirements and test methods. Step (b) may comprise removing material from the wire or wire blank to form a cutting edge of the endodontic instrument or device.

The heat-treat temperature can be from 300° C. up to but not equal to the melting point of the nickel titanium alloy. The heat treat-temperature can be from 350° C. up to but not equal to the melting point of the nickel titanium alloy. The heat-treat temperature can be from 400° C. up to but not equal to the melting point of the nickel titanium alloy. The heat-treat temperature can be from 450° C. up to but not equal to the melting point of the nickel titanium alloy. The heat-treat temperature can be from 300° C. to 525° C. The nickel titanium alloy can be heat-treated at the heat-treat temperature for 1 to 3 hours or more.

The nickel titanium alloy can be selected from nickel-titanium alloys of stoichiometric NiTi, near-equiatomic Ni—Ti, Ni—Ti—Nb alloys, Ni—Ti—Fe alloys, Ni—Ti—Cu alloys and other small percentage of trace metals.

Step (a) may comprise providing the wire or wire blank at a first temperature; and step (b) may comprise removing material from the wire or wire blank at a second temperature above the first temperature. Step (b) may comprise heating the wire or wire blank to the second temperature by submerging the wire or wire blank in a heated substance. Step (b) may comprise heating the wire or wire blank to the second temperature by submerging the wire or wire blank in a heated liquid or salt bath. Step (b) may comprise heating the wire or wire blank to the second temperature by ambient heating. Step (b) may comprise heating the wire or wire blank to the second temperature by induction heating. Step (b) may comprise heating the wire or wire blank to the second temperature by radiant heating. Step (b) may comprise heating the wire or wire blank to the second temperature by laser application. Step (b) may comprise heating the wire or wire blank to the second temperature by joulian heating.

In the method for forming an endodontic instrument or device, or the endodontic instrument or device prepared using the process steps, the first temperature can be room temperature. The second temperature can be greater than or equal to the austenite start temperature. The second temperature can be greater than or equal to the austenite finish temperature. The second temperature can be greater than or equal to 37° C.

Step (b) may further comprise allowing the endodontic instrument or device to cool to the first temperature. Step (b) may comprise mounting the wire or wire blank in a clamping mechanism and grinding the wire or wire blank to remove material from the wire or wire blank. Step (b) may comprise mounting the wire or wire blank in a clamping mechanism and rotating a grinding tool around the wire or wire blank while contacting the wire or wire blank to remove material from the wire or wire blank. Step (b) may comprise mounting the wire or wire blank in a clamping mechanism, rotating the wire or wire blank, and contacting a grinding tool with the wire or wire blank to remove material from the wire or wire blank. Step (b) may comprise grinding the wire or wire blank to remove material from the wire or wire blank and thereafter rotating a first end of the wire or wire blank while preventing rotation of a second end of the wire or wire blank. Step (b) may comprise removing material from the wire or wire blank to form a cutting edge of the endodontic file.

The endodontic instrument or device can be an endodontic file. The endodontic instrument or device can be an endodontic compactor. A cutting edge may be formed by helical flutes in the wire or wire blank. The endodontic file can have a diameter of 0.5 to 1.6 millimeters.

The nickel titanium alloy may comprise 54-57 weight percent nickel and 43-46 weight percent titanium. The nickel titanium alloy may consists essentially of 54-57 weight percent nickel and 43-46 weight percent titanium.

A third aspect of the invention is a method for forming an endodontic instrument or device. The method includes the steps of: (a) providing a wire or wire blank comprising a nickel titanium alloy at a first temperature; and (b) removing material from the wire or wire blank at a second temperature above the first temperature to form an endodontic instrument or device.

A fourth aspect of the invention is an endodontic instrument or device prepared by a process including the steps of: (a) providing a wire or wire blank comprising a nickel titanium alloy at a first temperature; and (b) removing material from the wire or wire blank at a second temperature above the first temperature to form an endodontic instrument or device.

In the method for forming an endodontic instrument or device, or the endodontic instrument or device prepared using the process steps, step (b) may comprise heating the wire or wire blank to the second temperature. The nickel titanium alloy in step (a) may comprise a B19' monoclinic martensite phase, an R-phase martensite phase, or mixtures thereof. The nickel titanium alloy in step (a) may consists essentially of a B19' monoclinic martensite phase, an R-phase martensite phase, or mixtures thereof.

Step (b) may comprise heating the wire or wire blank to the second temperature. Step (b) may comprise heating the wire or wire blank to the second temperature by submerging the blank in a heated substance. Step (b) may comprise heating the wire or wire blank to the second temperature by submerging the blank in a heated liquid or salt bath. Step (b) may comprise heating the wire or wire blank to the second temperature by ambient heating. Step (b) may comprise heating the wire or wire blank to the second temperature by induction heating. Step (b) may comprise heating the wire or wire blank to the second temperature by radiant heating. Step (b) may comprise heating the wire or wire blank to the second temperature by laser application. Step (b) may comprise heating the wire or wire blank to the second temperature by joulian heating. Step (b) may comprise mounting the wire or wire blank in a clamping mechanism and grinding the wire or wire blank to remove material from the wire or wire blank. Step (b) may comprise mounting the wire or wire blank in a clamping mechanism and rotating a grinding tool around the wire or wire blank while contacting the wire or wire blank to remove material from the wire or wire blank. Step (b) may comprise mounting the wire or wire blank in a clamping mechanism, rotating the wire or wire blank, and contacting a grinding tool with the wire or wire blank to remove material from the wire or wire blank. Step (b) may further comprise allowing the endodontic instrument or device to cool to the first temperature.

The first temperature can be room temperature. The second temperature can be greater than or equal to the austenite start temperature. The second temperature can be greater than or equal to the austenite finish temperature. The second temperature can be greater than or equal to 37° C. The nickel titanium alloy may comprise 54-57 weight percent nickel and 43-46 weight percent titanium. Step (b) may comprise grinding the wire or wire blank to remove material from the wire or wire blank and thereafter rotating a first end of the wire or wire blank while preventing rotation of a second end of the wire or wire blank.

The endodontic instrument or device can be an endodontic file. The endodontic file can have an angle greater than 5 degrees of permanent deformation after torque at 45 degrees of flexion tested in accordance with ISO Standard 3630 Part 1: General requirements and test methods. The endodontic file can have an angle greater than 10 degrees of permanent deformation after torque at 45 degrees of flexion tested in accordance with ISO Standard 3630 Part 1: General requirements and test methods. Step (b) may comprise removing material from the wire or wire blank to form a cutting edge of the endodontic file. The cutting edge may be formed by helical flutes in the wire or wire blank. The endodontic file can have a diameter of 0.5 to 1.6 millimeters.

The endodontic instrument or device can be an endodontic compactor. The endodontic compactor can have an angle greater than 5 degrees of permanent deformation after torque at 45 degrees of flexion tested in accordance with ISO Standard 3630 Part 1: General requirements and test methods. The endodontic compactor can have an angle greater than 10 degrees of permanent deformation after torque at 45 degrees of flexion tested in accordance with ISO Standard 3630 Part 1: General requirements and test methods. The endodontic compactor can have a diameter of 0.5 to 1.6 millimeters.

In the methods of the invention, any pattern can be fabricated from the wire. There is no limitation to the configuration which could include but not limited to: any taper (positive, neutral, variable or negative), any number of helical flutes or forms and blades, landed or no landed file, and cutting or non-cutting tips.

These and other features, aspects, and advantages of the present invention will become better understood upon consideration of the following detailed description, drawings, and appended claims.

BRIEF DESCRIPTION OF THE DRAWINGS

FIG. 1b is a partial detailed view of the shank of the endodontic instrument shown in FIG. 1a.

FIG. 2a shows a tooth having a sound outer structure but diseased pulp. FIG. 2b shows the tooth of FIG. 2a being cut with a dental drill. FIG. 2c shows a coronal access opening in the tooth after drilling. FIG. 2d shows enlarging the opening with a file. FIG. 2e shows a fully excavated cavity in the tooth.

Like reference numerals will be used to refer to like parts from Figure to Figure in the following description.

DETAILED DESCRIPTION OF THE INVENTION

Figure 1:
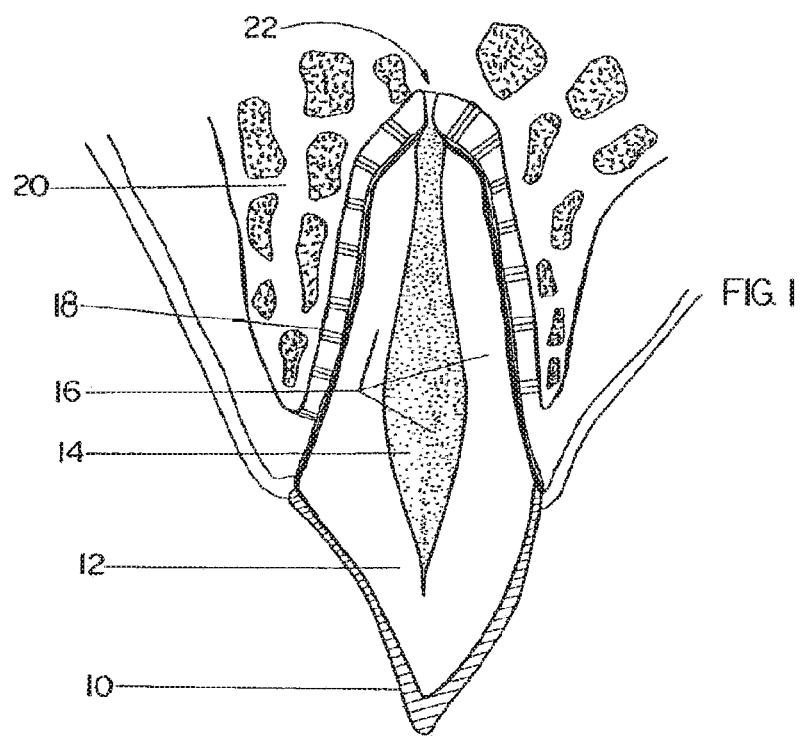
FIG. 1 is a cross-sectional view of a tooth.
Figures 2A, 2B, 2C, 2D, 2E:
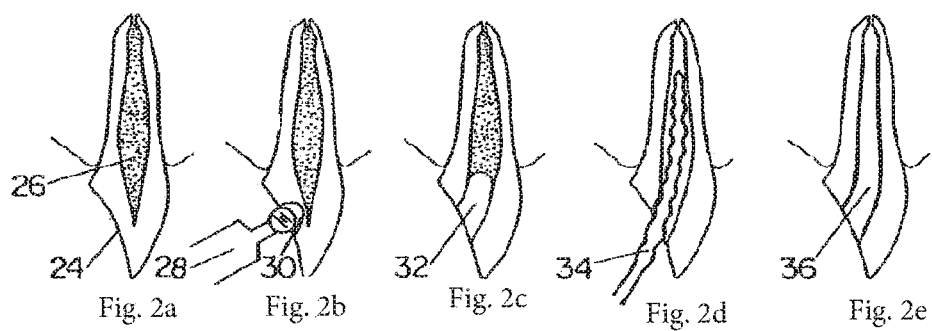
FIGS. 2a-2e represent a prior art procedure for preparing a tooth for endodontic restoration.
Figure 1A:
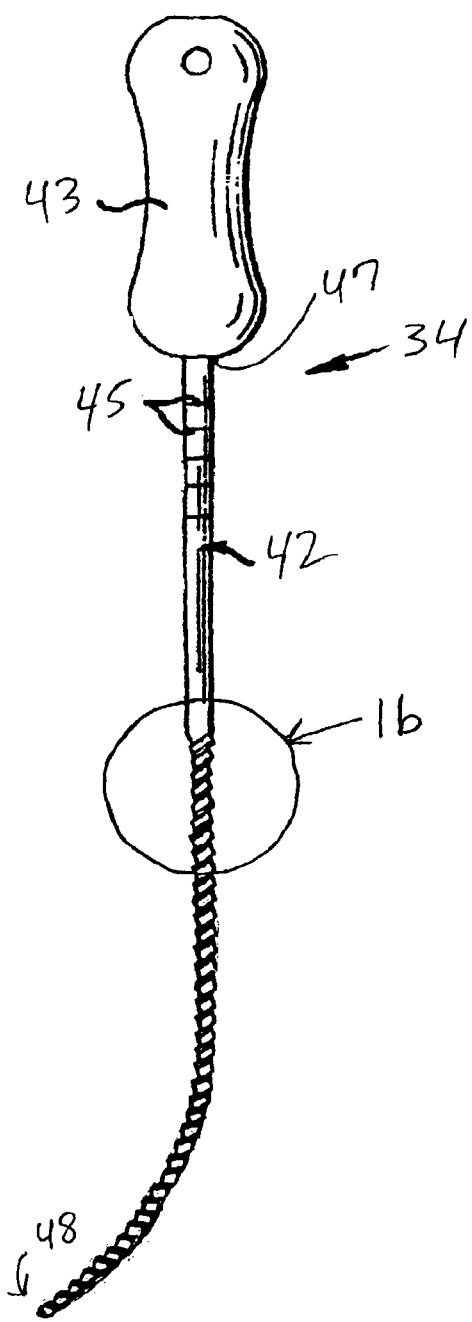
FIG. 1a is a side elevational view of an endodontic instrument.
Figure 1B:
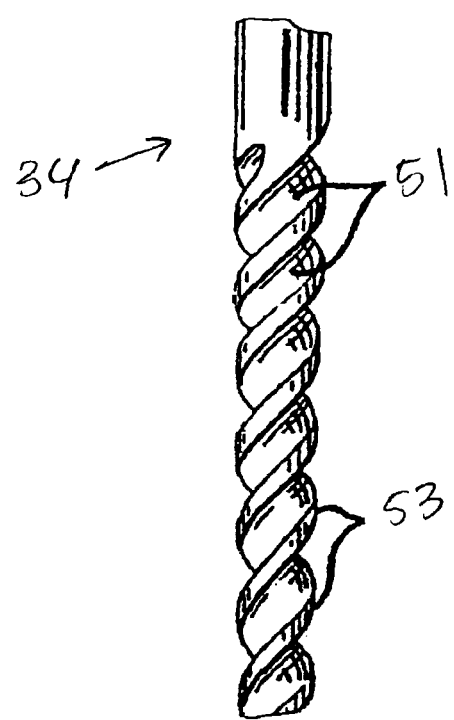

One example method of the invention forms an endodontic instrument for use in performing root canal therapy on a tooth. This endodontic instrument as shown in FIG. 1a includes an elongate shank 42 mounted at its proximate end 47 to a handle 43. The shank 42 may be about 30 millimeters long. The proximate end 47 may have a diameter of about 0.5 to about 1.6 millimeters. The shank 42 may include calibrated depth markings 45 and further includes a distal end 48. The shank 42 may include two continuous helical flutes 51 as shown in FIG. 1b that extend along its lower portion. The flutes 51 define a cutting edge. A helical land 53 is positioned between axially adjacent flutes as shown in FIG. 1b. Some instruments may be produced with a radial land or no land.

The shank 42 comprises a nickel titanium alloy. An example nickel-titanium alloy includes 54-57 weight percent nickel and 43-46 weight percent titanium. Preferably, the titanium alloy used for the shank includes 54-57 weight percent nickel and 43-46 weight percent titanium and is commercially available as Nitinol 55. Thus, most preferably, the shank consists essentially of 54-57 weight percent nickel and 43-46 weight percent titanium thereby avoiding the inclusion of elements that affect the properties of the alloy. The nickel titanium alloy may also be selected from nickel-titanium alloys of stoichiometric NiTi, near-equiatomic Ni—Ti, Ni—Ti—Nb alloys, Ni—Ti—Fe alloys, Ni—Ti—Cu alloys and other small percentage of trace metals.

A first non-limiting embodiment of a method of the invention is a method for forming an endodontic instrument or device such as that shown in FIGS. 1a and 1b. The method includes the steps of: (a) providing a wire or wire blank comprising a nickel titanium alloy that has been heat-treated at a heat-treat temperature and has an angle greater than 5 degrees of permanent deformation after torque at 45 degrees of flexion tested in accordance with ISO Standard 3630 Part 1: General requirements and test methods; and (b) removing material from the wire or wire blank to form an endodontic instrument or device. Alternatively, the heat-treated wire or wire blank in step (a) may have an angle greater than 10 degrees of permanent deformation after torque at 45 degrees of flexion tested in accordance with ISO Standard 3630 Part 1: General requirements and test methods, or an angle greater than 15 degrees of permanent deformation after torque at 45 degrees of flexion tested in accordance with ISO Standard 3630 Part 1: General requirements and test methods, or an angle greater than 20 degrees of permanent deformation after torque at 45 degrees of flexion tested in accordance with ISO Standard 3630 Part 1: General requirements and test methods.

Step (b) of this embodiment of the method may comprise removing material from the wire or wire blank to form a cutting edge of the endodontic instrument or device. One non-limiting example method for removing the material is grinding. Grinding can create the proper taper and flutes with the correct number of spirals in a single cycle of a grinding machine. The wire or wire blank can be rotated and fed in a feed direction towards a rotating grinding wheel. The grinding wheel may have a disk-like shape and may be positioned in such a manner that the axis of rotation of the grinding wheel is parallel to the axis of rotation of the wire or wire blank. The grinding wheel has a contoured grinding surface for manufacturing instruments of various sizes as defined by the International Organization for Standardization (ISO) or the American National Standards Institute (ANSI) and the American Dental Association (ADA). To form the proper taper on the file as defined by the ISO and ANSI/ADA, adjacent ribs have a difference in height corresponding to the specific taper required on the instrument being manufactured. In the process of manufacturing the instruments, the proper taper is formed by translating either the rotating wire or wire blank portion of the machine or the grinding wheel portion of the machine so as to continuously increase the distance there is between the wire or wire blank which is simultaneously rotated and fed during the fluting operation. The outer diameter of the instrument is generated during the fluting process. Another non-limiting example method for removing the material is electrical discharge machining.

Because the nickel titanium wire or wire blank has been provided in a heat-treated condition in step (a), the wire or wire blank may be in a non-austenitic state at room temperature. Therefore, the wire or wire blank may need to be maintained above its phase transition temperature in the austenite phase when grinding or machining. Preferably, the wire or wire blank is maintained above the austenite start temperature ($A_s$) or the austenite finish temperature ($A_f$) or a temperature greater than or equal to 37° C. This may be accomplished by electrical heating methods, heating the surrounding atmosphere, by submerging the wire or wire blank in a heated liquid, salt bath, or any other suitable heating method. Thus the wire or wire blank can be maintained in the austenite phase during the grinding or machining process and may be accomplished through several different methods, such as ambient, induction, joulian, laser, or radiant heating, or submersion within a heated liquid or salt bath. Ambient heating, for example, may be accomplished in an oven while induction heating may utilize an inductive heating coil surrounding the wire or wire blank. Submersion within a heated liquid or salt bath can allow the wire or wire blank to be heated in a rapid and controlled manner. The heated liquid may be oil or a salt solution, or other liquids that do not boil below or close to the $A_f$ of the particular alloy of the wire or wire blank. A fluting apparatus is provided generally above a vessel containing the liquid and includes a rotary motion mechanism for holding and rotating an wire blank or wire, such as a file blank, a clamping mechanism that receives a ground portion of the file blank and a linear or axial motion mechanism for moving the clamping mechanism along the longitudinal axis of the file blank at a rate which is proportional to the rate of rotation.

An endodontic instrument should provide an elongate shank having a proximate end and an opposite pilot end, and at least one continuous helical flute formed in the shank so as to extend along at least a major portion of the axial length of the shank and to the pilot end and so as to define a working length of the shank. This may be accomplished by rotating a first end of the blank while preventing rotation of a second end of the blank. In another format, a tapered blank is rotated and fed across a grinding wheel at a rate which will produce the helical flute. The depth of cut is controlled to produce the cutting edges. It is preferable that the flutes be ground at a constant helix angle which means that pitch will increase as the diameter of the shank increases. In order to make a dental reamer or a dental file the primary difference is that the helix angle of the flutes of a dental reamer is steeper, relative to the longitudinal axis of the shank, than is the helix angle of the flutes of a dental file. The ground or machined endodontic instrument or device may be cooled to room temperature after grinding or machining.

Step (a) of this embodiment of the method may comprise providing a wire or wire blank that has been heat-treated at a heat-treat temperature. The heat-treat temperature may be from 300° C. up to but not equal to the melting point of the nickel titanium alloy, the heat treat temperature may be from 350° C. up to but not equal to the melting point of the nickel titanium alloy, the heat treat temperature may be from 400° C. up to but not equal to the melting point of the nickel titanium alloy, the heat treat temperature may be from 450° C. up to but not equal to the melting point of the nickel titanium alloy, or the heat treat temperature may be from 300° C. to 525° C. The nickel titanium alloy may be heat-treated at the heat-treat temperature for 1 to 3 hours, or more.

A second non-limiting embodiment of a method of the invention is a method for forming an endodontic instrument or device. The method includes the steps of: (a) providing a wire or wire blank comprising a nickel titanium alloy at a first temperature; and (b) removing material from the wire or wire blank at a second temperature above the first temperature to form an endodontic instrument or device. The wire or wire blank may be heated to the second temperature prior to and/or during removing material from the wire or wire blank. The nickel titanium alloy in step (a) may comprise a B19' monoclinic martensite phase, an R-phase martensite phase, or mixtures thereof. The nickel titanium alloy in step (a) may consist essentially of a B19' monoclinic martensite phase, an R-phase martensite phase, or mixtures thereof.

Heating the wire or wire blank to the second temperature can be achieved by submerging the wire or wire blank in a heated substance, such as a heated liquid or salt bath, or heating the wire or wire blank by ambient heating, or heating the wire or wire blank by induction heating, or heating the wire or wire blank by radiant heating, or heating the wire or wire blank by laser application, or heating the wire or wire blank by joulian heating. The second temperature may be greater than or equal to the austenite start temperature. The second temperature may be greater than or equal to the austenite finish temperature. The second temperature may be greater than or equal to 37° C.

Removing material from the wire or wire blank can be achieved by mounting the wire or wire blank in a clamping mechanism and grinding the wire or wire blank to remove material from the wire or wire blank. Removing material from the wire or wire blank can be achieved by mounting the wire or wire blank in a clamping mechanism and rotating a grinding tool around the wire or wire blank while contacting the wire or wire blank to remove material from the wire or wire blank. Removing material from the wire or wire blank can be achieved by mounting the wire or wire blank in a clamping mechanism, rotating the wire or wire blank, and contacting a grinding tool with the wire or wire blank to remove material from the wire or wire blank thereby forming a helical cutting edge of the endodontic file. After grinding, the endodontic instrument or device can be cooled to room temperature. Optionally after grinding, a first end of the wire or wire blank may be rotated while preventing rotation of a second end of the wire or wire blank to form a twisted endodontic file.

Removing material from the wire or wire blank can be achieved by mounting the wire or wire blank in a clamping mechanism and grinding the wire or wire blank to remove material from the wire or wire blank. Removing material from the wire or wire blank can be achieved by mounting the wire or wire blank in a clamping mechanism and rotating a grinding tool around the wire or wire blank while contacting the wire or wire blank to remove material from the wire or wire blank. Removing material from the wire or wire blank can be achieved by mounting the wire or wire blank in a clamping mechanism, rotating the wire or wire blank, and contacting a grinding tool with the wire or wire blank to remove material from the wire or wire blank thereby forming a tapered instrument such as an endodontic compactor. These could include but not limited to hand spreader, hand condenser, finger spreader and finger condenser. These instruments are utilized to obturate a completed endodontic procedure. After grinding, the endodontic instrument or device can be cooled to room temperature.

An endodontic file produced by the method may have an angle greater than 5 degrees of permanent deformation after torque at 45 degrees of flexion tested in accordance with ISO Standard 3630 Part 1: General requirements and test methods, or an angle greater than 10 degrees of permanent deformation after torque at 45 degrees of flexion tested in accordance with ISO Standard 3630 Part 1: General requirements and test methods, or an angle greater than 15 degrees of permanent deformation after torque at 45 degrees of flexion tested in accordance with ISO Standard 3630 Part 1: General requirements and test methods, or an angle greater than 20 degrees of permanent deformation after torque at 45 degrees of flexion tested in accordance with ISO Standard 3630 Part 1: General requirements and test methods.

Thus, the invention provides medical and dental instruments, and particularly endodontic instruments, such as drills, burs and files, that have high resistance to torsion breakage, maintain shape upon fracture, can withstand increased strain, and can hold sharp cutting edges such that the instruments overcome the problems encountered when cleaning and enlarging a curved root canal.

Although the present invention has been described in considerable detail with reference to certain embodiments, one skilled in the art will appreciate that the present invention can be practiced by other than the described embodiments, which have been presented for purposes of illustration and not of limitation. For example, while the present invention finds particular utility in the field of endodontic instruments, the invention is also useful in other medical and dental instruments used in creating or enlarging an opening and also for use as an endodontic compactor in the obturation of an endodontic procedure. Therefore, the scope of the appended claims should not be limited to the description of the embodiments contained herein.

What is claimed is:

1. A method for forming an endodontic instrument or device, the method comprising:
   (a) providing a wire or wire blank comprising a nickel titanium alloy that has been heat-treated at a heat-treat temperature for 1 hour or more and has an angle greater than 5 degrees of permanent deformation after torque at 45 degrees of flexion tested in accordance with ISO Standard 3630 Part 1: General requirements and test methods; and
   (b) removing material from the wire or wire blank to form an endodontic instrument or device,
   wherein the heat-treat temperature is from 300° C. up to but not equal to the melting point of the nickel titanium alloy.

2. The method of claim 1 wherein:
the heat-treated wire or wire blank in step (a) has an angle greater than 10 degrees of permanent deformation after torque at 45 degrees of flexion tested in accordance with ISO Standard 3630 Part 1: General requirements and test methods.

3. The method of claim 1 wherein:
step (b) comprises removing material from the wire or wire blank to form a cutting edge of the endodontic instrument or device.

4. The method of claim 1 wherein:
the heat-treat temperature is from 300° C. to 525° C.

5. The method of claim 1 wherein:
the nickel titanium alloy has been heat-treated at the heat-treat temperature for 1 to 3 hours.

6. The method of claim 1 wherein:
step (a) comprises providing the wire or wire blank at a first temperature; and
step (b) comprises removing material from the wire or wire blank at a second temperature above the first temperature.

7. The method of claim 6 wherein:
the second temperature is greater than or equal to the austenite start temperature.

8. The method of claim 6 wherein:
step (b) comprises heating the wire or wire blank to the second temperature.

9. The method of claim 6 wherein:
the first temperature is room temperature.

10. The method of claim 6 wherein:
the second temperature is greater than or equal to 37° C.

11. The method of claim 1 wherein:
the endodontic instrument or device is an endodontic file, and
step (b) comprises removing material from the wire or wire blank to form a cutting edge of the endodontic file.

12. The method of claim 11 wherein:
the endodontic file has a diameter of 0.5 to 1.6 millimeters.

13. The method of claim 1 wherein:
the nickel titanium alloy consists essentially of 54-57 weight percent nickel and 43-46 weight percent titanium.

* * * * *